US012756137B2

(12) United States Patent
Speaker, IV

(10) Patent No.: US 12,756,137 B2
(45) Date of Patent: Oct. 6, 2026

(54) CONNECTOR WITH MULTIPLE SEALS FOR PREVENTING FLUID FLOW INTO COUPLED TOGETHER ENERGY TRANSMISSION LINES

(71) Applicant: Whitney Blake Company, Bellows Falls, VT (US)

(72) Inventor: Theodore J. Speaker, IV, Monterrey (MX)

(73) Assignee: Whitney Blake Company, Bellows Falls, VT (US)

( * ) Notice: Subject to any disclaimer, the term of this patent is extended or adjusted under 35 U.S.C. 154(b) by 414 days.

(21) Appl. No.: 18/633,794

(22) Filed: Apr. 12, 2024

(65) Prior Publication Data

US 2025/0323451 A1 Oct. 16, 2025

(51) Int. Cl.
*H01R 13/52* (2006.01)
*H01R 13/504* (2006.01)

(52) U.S. Cl.
CPC ....... *H01R 13/5219* (2013.01); *H01R 13/504* (2013.01)

(58) Field of Classification Search
CPC .............. H01R 13/504; H01R 13/5219; H01R 13/52
USPC ................................ 439/271, 274, 587, 595
See application file for complete search history.

(56) References Cited

U.S. PATENT DOCUMENTS

| | | | | |
|---|---|---|---|---|
| 5,660,555 A * | 8/1997 | Ito | H01R 13/5221 | 439/281 |
| 6,482,021 B2 * | 11/2002 | Hara | B29C 45/14639 | 439/587 |
| 7,275,949 B1 * | 10/2007 | Speaker, IV | H01R 13/5219 | 439/271 |
| 7,419,395 B2 * | 9/2008 | Tsuji | H01R 13/4365 | 439/271 |
| 11,309,650 B2 * | 4/2022 | George | H01R 13/5812 | |

* cited by examiner

*Primary Examiner* — Tulsidas C Patel
*Assistant Examiner* — Carlos E Lopez-Pagan
(74) *Attorney, Agent, or Firm* — Fresh IP PLC; Terrence L.B. Brown

(57) ABSTRACT

Connector includes male coupler including core and layer on perimeter of the core, core has free end extending past the layer. The core is more rigid than the layer. Energy transmission line is in the core of the male coupler. First seal on an outer perimeter of the layer of the male coupler has one triangular extension around the outer perimeter of the layer. Second seal provided on the core of the male coupler has one ring-shaped groove around the perimeter of the core. Third seal on the perimeter of the core has an angled lip around the perimeter of the core at the free end of the core. Female coupler has first, second, and third mating seals which mate with those on the male coupler. Those three mating first, second, and third seals prevent fluid flow into the coupled together couplers at a pressure equal to a pressure exerted by water at a depth of 3 m.

14 Claims, 7 Drawing Sheets

FIG. 4
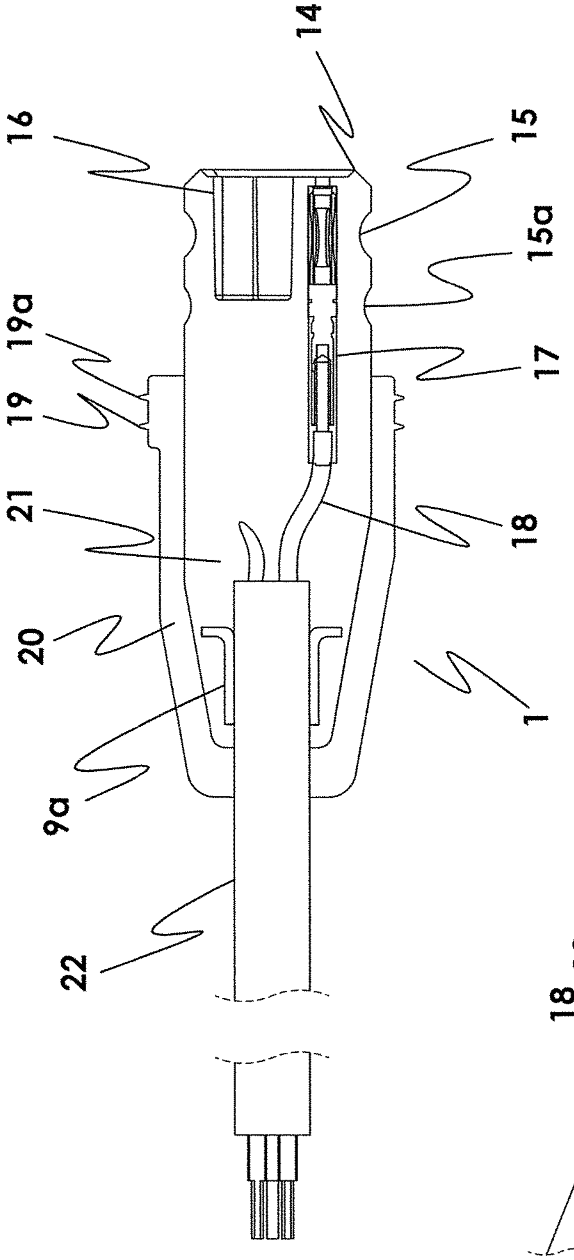
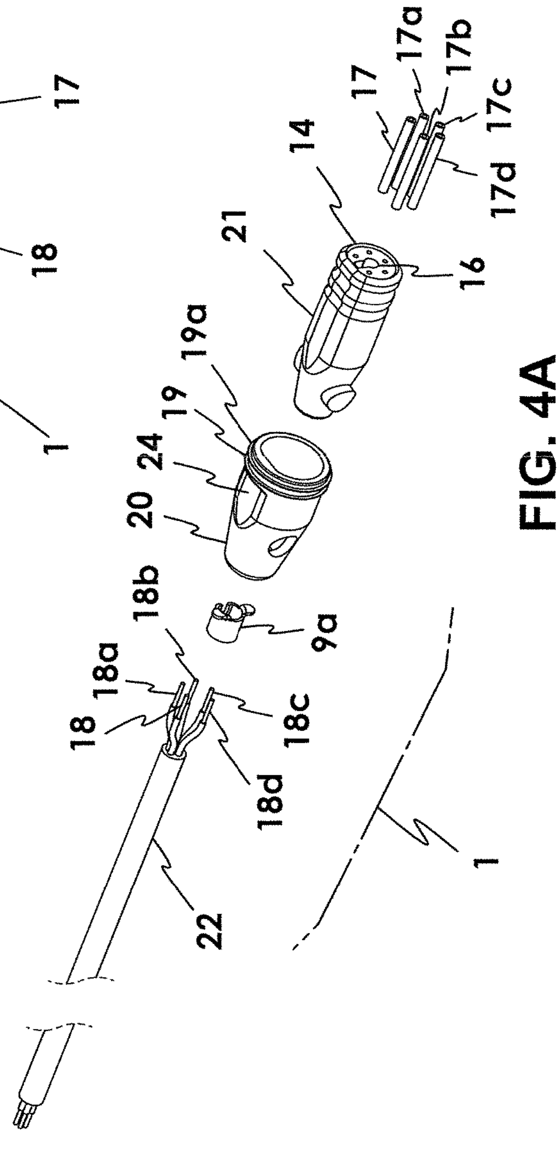
FIG. 4A

CONNECTOR WITH MULTIPLE SEALS FOR PREVENTING FLUID FLOW INTO COUPLED TOGETHER ENERGY TRANSMISSION LINES

FIELD OF THE INVENTION

The invention relates to a coupler system or connector. In particular, a connector with a male and a female coupler, and multiple fluid seals for preventing the flow of gas, such as air laden with moisture and dust, as well as liquids, such as water, into a coupled together male and female coupler.

BACKGROUND OF THE INVENTION

Known coupler systems include U.S. Pat. No. 7,275,949 B1, issued Oct. 2, 2007 (Whitney Blake, Bellow Falls, VT) and U.S. Pat. No. 7,803,005 B1 (Whitney Blake, Bellow Falls, VT), issued Sep. 28, 2010.

OBJECTS AND SUMMARY OF THE INVENTION

It is an object of the invention to provide a connector for preventing fluid flow into a coupled together energy transmission line in a coupled together male and female coupler including preventing liquid and gas flow.

It is an object of the invention to provide a connector for preventing fluid flow into a coupled together energy transmission line in a coupled together male and female coupler including one or more seals which prevent liquid and gas flow.

It is an object of the invention to provide a connector for preventing fluid flow into a coupled together energy transmission line in a coupled together male and female coupler including one or more seals which prevent liquid and gas flow by using a combination of rigid and flexible seals; for example, at least one seal including a rigid seal and a flexible mating seal for preventing fluid flow, and at least one seal including a flexible seal and a flexible mating seal for preventing fluid flow.

It is a further object of the invention to provide a connector for preventing fluid flow into a coupled together energy transmission line in a coupled together male and female coupler including one or more seals which prevent liquid and gas flow by using a combination of rigid and flexible seals; for example, at least two seals including a rigid seal and a flexible mating seal for preventing fluid flow, and at least one seal including a flexible seal and a flexible mating seal for preventing fluid flow.

It is an object of the invention to provide a fluid resistant connector for preventing fluid flow into a coupled together energy transmission line in a coupled together male and female coupler at a pressure equal to a pressure exerted by water at a depth of 3 meters (m).

It is an object of the invention to provide a fluid resistant connector for preventing fluid flow into a coupled together energy transmission line in a coupled together male and female coupler at a pressure equal to a pressure exerted by water at a depth of 3 meters (m) and for at least 24 hours.

It is an object of the invention to provide a fluid resistant connector for preventing fluid flow into a coupled together energy transmission line in a coupled together male and female coupler including liquid and gas flow that is one or more of resistant to degradation by water, sea water, ultraviolet (uv) radiation degradation.

It is an object of this invention to provide a moisture and dust resistant coupler system for electrical, communication and other systems.

It is yet another object of this invention to provide such a device that can be easily connected and disconnected without decreasing the liquid, gas, moisture and dust resistance of the connector.

In sum, the invention includes:

A connector, including:

a) a male coupler including a core and a layer on a perimeter of the core, the core having a free end, the free end of the core extending past the layer, and the core being more rigid than the layer; and an energy transmission line located within the core of the male coupler;

b) a first seal provided on an outer perimeter of the layer of the male coupler, the first seal including at least one triangular extension around the outer perimeter of the layer;

c) a second seal provided on the core of the male coupler, the second seal including at least one ring-shaped groove around the perimeter of the core;

d) a third seal provided on the perimeter of the core, the third seal including an angled lip around the perimeter of the core at the free end of the core;

e) a female coupler including a core having a free end, a layer on a perimeter of the core, the layer extending outwardly of the free end of the core, and the core being more rigid than the layer; and a further energy transmission line located within the core of the female coupler;

f) a first mating seal provided on the female coupler, the first mating seal including a face around an inner perimeter of the layer extending outwardly of the free end of the core of the female coupler, the face around the inner perimeter of the layer engaging with the at least one triangular extension around the outer perimeter of the layer of the male coupler;

g) a second mating seal provided on the female coupler, the second mating seal including at least one ring-shaped extension provided on the face of the layer on the female coupler which engages with and mates with a respective one of the at least one ring-shaped groove on the core of the male coupler;

h) a third mating seal provided on the female coupler, the third mating seal including a face on the layer which engages with and mates with the angled lip on the perimeter of the core of the male extension;

i) whereas, when the female coupler and the male coupler are coupled together, the energy transmission line in the male coupler and the further energy transmission line in the female coupler are coupled together for transmitting energy therethrough; and j) whereas, the first seal and the first mating seal, the second seal and the second mating seal, and the third seal and third mating seal prevent fluid flow into the coupled together energy transmission line in the coupled together male and female coupler at a pressure equal to a pressure exerted by water at a depth of 3 meters (m).

The connector may include:

a) the first seal and the first mating seal, the second seal and the second mating seal, and the third seal and third mating seal prevent fluid flow at a pressure equal to a pressure exerted by water at a depth of 3 meters (m) for at least 24 hours (h).

The connector may include:

a) the material of at least one of the first seal and the first mating seal, the second seal and the second mating seal, and the third seal and third mating seal is resistant to degradation by ultraviolet (UV) radiation.

The connector may include:

the material of at least one of the first seal and the first mating seal, the second seal and the second mating seal, and the third seal and third mating seal is resistant to degradation by saltwater.

The connector may include:

a) the material of the core of the male coupler, and the material of the core of the female coupler are each made of a polymer.

The connector may include:

the material of the layer of the male coupler, and the material of the layer of the female coupler are each made of a thermoplastic polymer.

The connector may include:

a) the material of at least one of the first seal and the first mating seal, the second seal and the second mating seal, and the third seal and third mating seal is resistant to degradation by water.

The connector may include:

a) the energy transmission line in the male coupler and the further energy transmission line in the female coupler are coupled together for transmitting electricity therethrough.

The connector may include:

a) the energy transmission line in the male coupler and the further energy transmission line in the female coupler are coupled together for transmitting telecommunications signals therethrough.

The connector may include:

a) the at least one triangular extension around the outer perimeter of the layer includes a continuous extension around the circumference of the perimeter.

The connector may include:

a) the at least one triangular extension around the outer perimeter of the layer includes a first triangular extension and a second triangular extension.

The connector may include:

a) the second triangular extension is adjacent to the first triangular extension.

DRAWINGS

In the drawings:

FIG. 4 is a detailed view of the male coupler element of this invention.

FIG. 4A is an exploded version of FIG. 4.

Relative terms such as left, right, up, and down are for convenience only and are not intended to be limiting.

The relative terms rigid and flexible as used herein are used to refer to the rigid core and the flexible layer, for example. That is, to refer to the rigid core being stiffer than the flexible layer of the connector. Further, the over-mold on the core may include the layer which is more flexible than the rigid core.

DETAILED DESCRIPTION OF THE INVENTION

Figure 1:
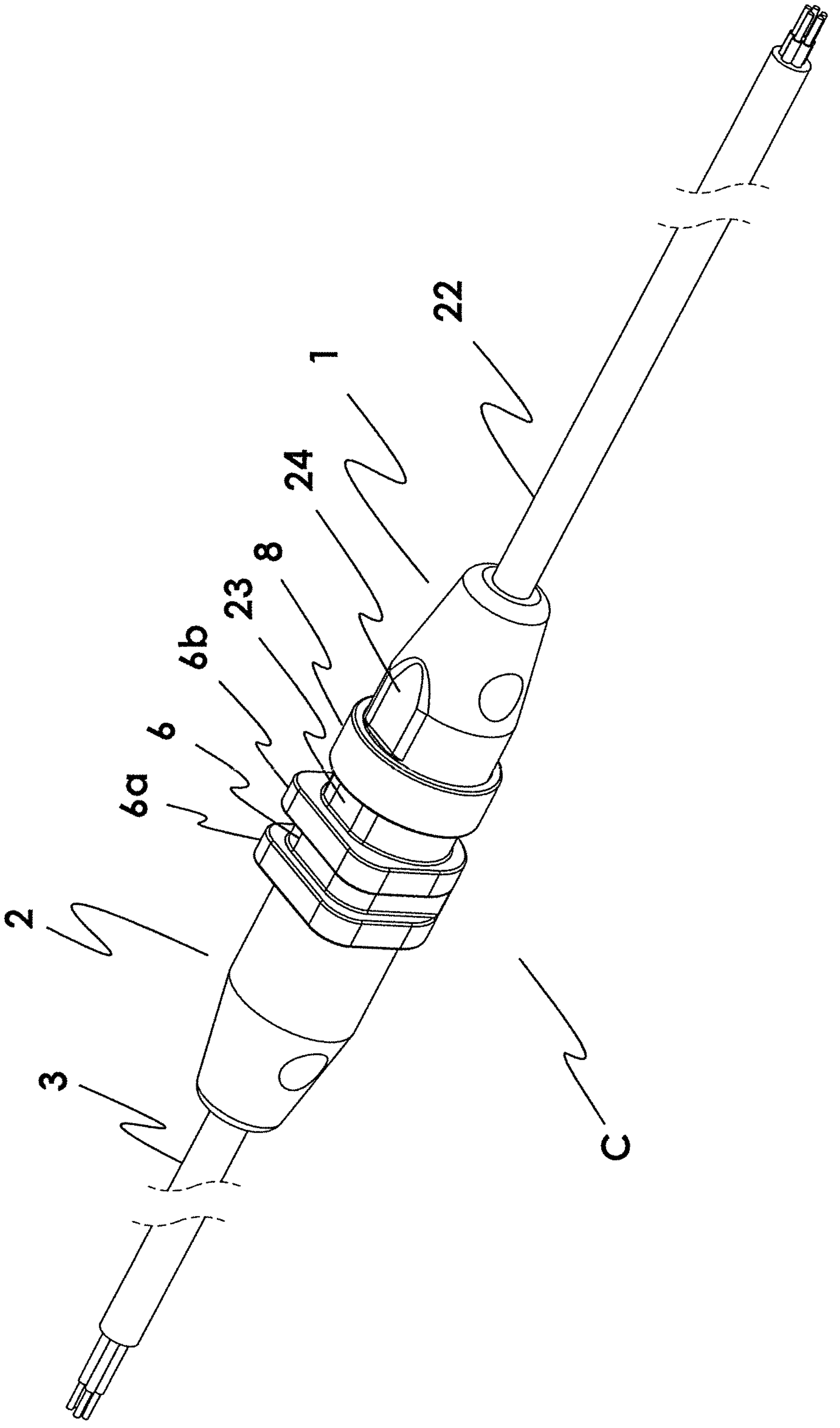
FIG. 1 is a perspective view of a connector system of this invention.

FIG. 1 shows a perspective side view of a connector C according to the invention. In FIG. 1 a male coupler 1, which encapsulates a communications or electrical cable or energy transmission line 22, is inserted into a female coupler 2, which encapsulates another communications or electrical cable or energy transmission line 3. Line elements known in the industry as conductors can be seen exiting energy transmission line 3 at one end and terminating at pin terminals, not shown in this figure, at the opposite end. Line elements known in the industry as conductors can be seen exiting energy transmission line 22 at one end and terminating at socket terminals, not shown in this figure, at the opposite end. Two ridges 6*a* and 6*b* are shown on an outside of female coupler 2 along with a groove 6. These provide a mounting mechanism which provides a means of securing the connected coupling system.

Flat surfaces are provided as a surface 24 on male coupler 1 and a surface 23 on female coupler 2, for example, to visually aid and help align the coupler elements when joining. See FIG. 1, for example.

In addition to these exterior flat surfaces an interior key, not shown in this figure, may also be included for proper alignment when connecting male coupler 1 with female coupler 2 to ensure that polarity of cable conductor elements of cable elements 3 and 22, respectively are maintained.

Figure 2:
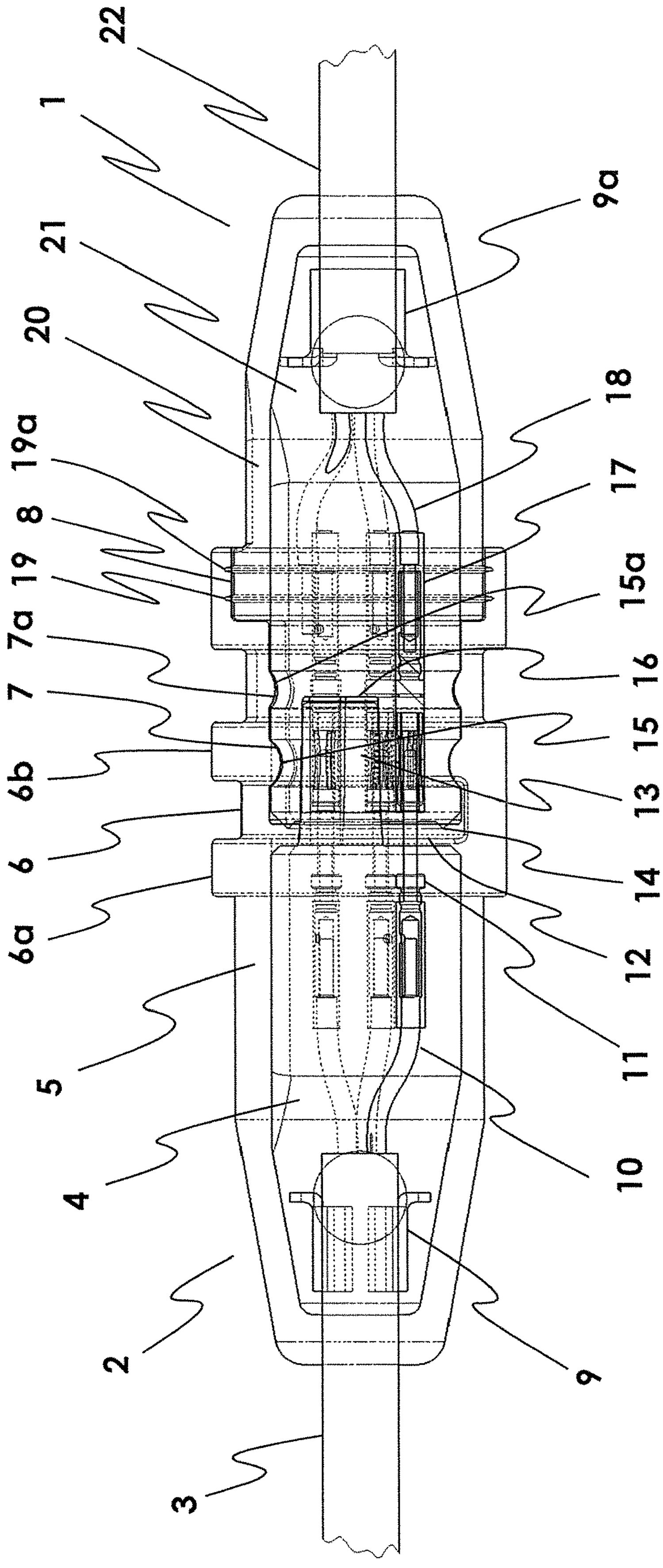
FIG. 2 is a cut-away view of the connector system of this invention showing some of the interior detail.

FIG. 2 is a cut-away side view of the coupling elements from FIG. 1. In this particular view one can see the male coupler 1 inserted into the female coupler 2. Cables or lines 3 and 22 containing at least one conductor are shown firmly enclosed or encapsulated as inner layers within their respective coupler elements. Emanating from each cable or line are the conductors themselves. In this view one conductor 18 in particular is shown emanating from within male coupling element 1 and one conductor 10 from female coupling element 2. On the end of the conductor emanating from within female coupler 2 is a connecting device 11 shown as, but not limited to, a male pin 11 on the female coupler and designed to mate with female socket 17 shown as, but not limited to, a female socket 17 encapsulated in the female coupler 2. In this view the continuity of wires takes place when the male connecting pin 11 is firmly placed within the female socket 17. Other conductors are shown in dotted lines throughout the joined couplers, and they are co-joined in a like manner as described herein.

One can clearly see the details of the fluid seals including moisture and dust sealing elements or seals as described as follows.

A flexible outer over-mold portion or male gripping element 20 is found on male coupler 1 containing a first seal 19 and 19*a* including triangular shaped seals including extensions 19 and 19*a* may be formed circumferentially on an outer perimeter of male gripping element 20; and triangular shaped sealing features 19 and 19*a* will press into the first mating seal 8 including inside sealing surface or face 8 of over-mold 5 found on female coupler 2 to form the initial moisture and dust seal when male connector element 1 is connected to female coupler 2.

A second mating seal 7 and 7a including ring-shaped extensions 7 and 7a on the female coupler 2 will fit closely into a second seal 15 and 15a including ring-shaped grooves 15 and 15a found on the exterior of male coupler 1. This matching of ring-shaped extensions 7 and 7a with ring-shaped grooves 15 and 15a provides a secondary fluid seal which is a moisture and dust seal when male coupler 1 is connected to female coupler 2, as well as holding the male coupler 1 connected to the female coupler 2. In other words, when male coupler 1 is connected to female coupler 2 it may serve as a holding mechanism.

Figure 3:
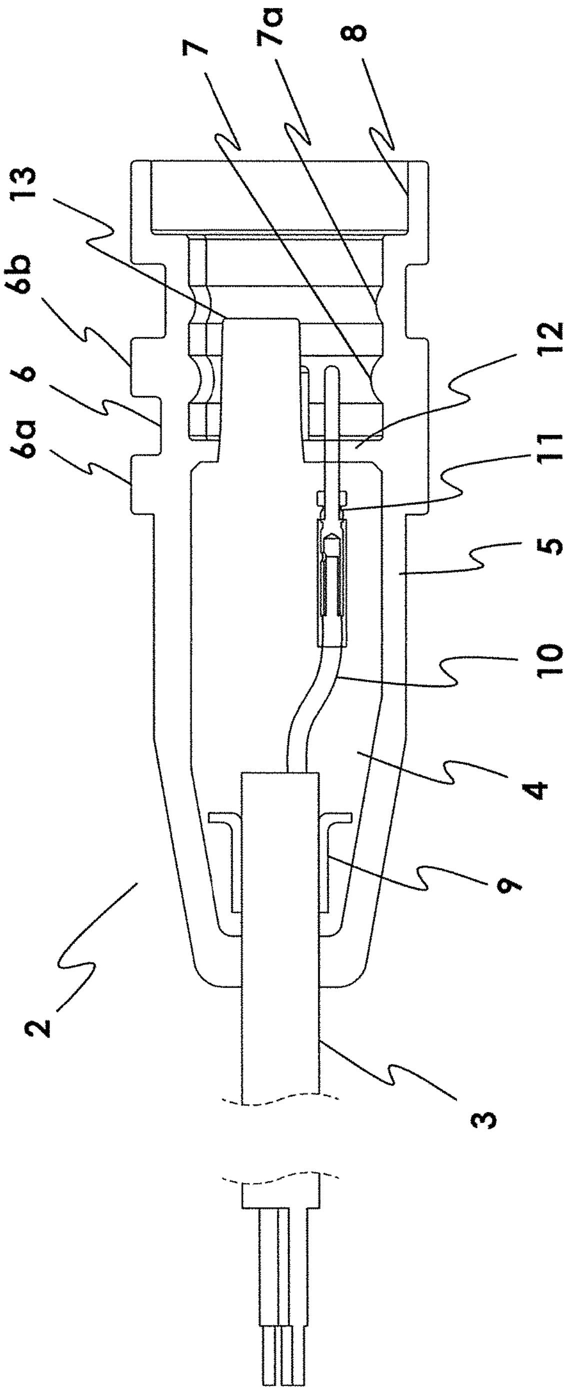
FIG. 3 is a detailed view of the female coupler element of this invention.

Male coupler 1 and female coupler 2 include, such as being formed from a combination of rigid and flexible plastic materials for encapsulating the terminal elements shown within. A flexible outer over-mold portion 20 on male coupler 1 and over-mold portion 5 on female coupler 2 and are formed over rigid inner pre-molded elements 21 and 4, respectively. A third seal including a pointed lip 14 circumferentially formed at the second end of male coupler 1 is also shown. In this view, pointed lip 14 of male coupler 1 is pressed into a third mating seal 12 including a face 12 on female coupler 2 by the force of connecting male coupler 1 with female coupler 2. That provides the third seal. When this arrangement is put together, i.e., coupled together, a person having ordinary skill in the art can understand that the seals in this device will ensure not only a tight fit so as to join electrical or communication cable, i.e., energy transmission lines, but also to encapsulate the energy transmission lines so as to prevent fluid flow into the coupled together energy transmission line to thus provide a seal to prevent fluid flow, including water and air to provide a liquid, air, and moisture and dust resistant sealed connector. FIG. 3 shows additional detail taken from FIG. 2. In this particular view only female coupler 2 of FIG. 2 is shown and has been enlarged. FIG. 2 shows the rings on flexible over-mold 5, that is second mating seal 7 and 7a as well as flexible sealing surfaces 12 and 8. Looking further one can see that cable element 3 containing conductor element 10 is terminated to pin element 11 and also shown is a key 13. The key 13 ensures that polarity of all circuits is realized with each reconnection of the male 1 and female 2 coupler elements. Additional conductors for electrical or communication connections may be included but are not shown in this figure.

Figure 3A:
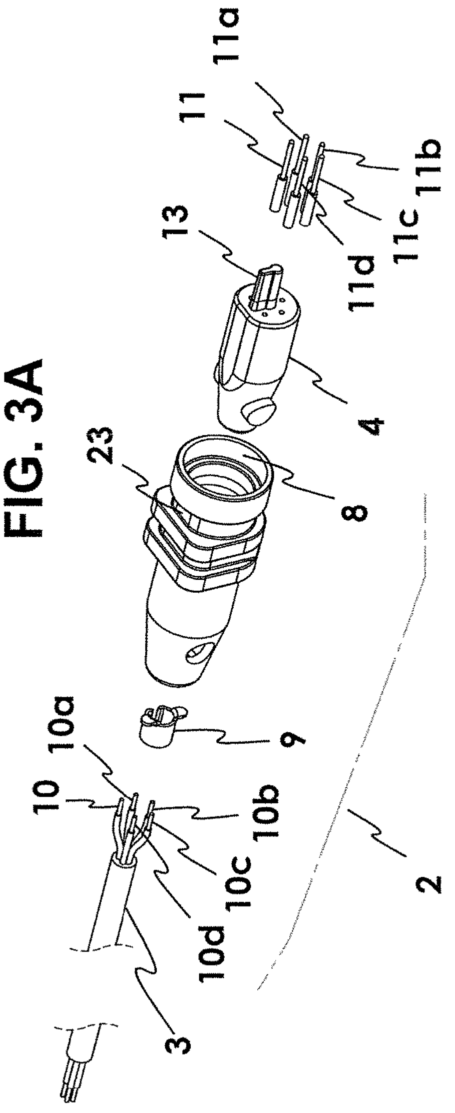
FIG. 3A is an exploded version of FIG. 3

FIG. 3A shows an exploded view of FIG. 3 showing the various parts as they are placed within female coupler 2 including several additional conductors 10a thru 10d and pin terminal elements 11a thru 11d. This view includes 5 conductor and pin elements but in actuality there are no limits to the quantities that can be included at the time of design.

FIG. 4 shows additional detail taken from FIG. 2. In this view only the male connector element 1 portion of FIG. 2 is shown and has been enlarged. Here can be clearly seen flexible triangular shaped sealing features 19 and 19a formed on flexible over-mold element 20. Also seen is rigid pre-mold element 21 extending out of the flexible element 20 and containing grooves shown as 15 and 15a as well as pointed lip 14. In addition, cable element 22 containing conductor element 18 connected to socket element 17 and a key 16 are shown; as shown, key 16 may be a female pocket and key 13 may be a male key sized to fit and align in the pocket. The key 16 ensures that polarity of all circuits is realized with each reconnection of the male 1 and female 2 coupler elements. Additional conductors for electrical or communications connections may be included but are not shown in this figure.

FIG. 4A shows an exploded view of FIG. 4 showing the various parts as they are placed within male coupler 1 including several additional conductors 18a thru 18d and socket terminal elements 17a thru 17d. This view contains five (5) conductor and pin elements but in actuality there are no limits to the quantities that can be included at the time of design.

Figure 5:
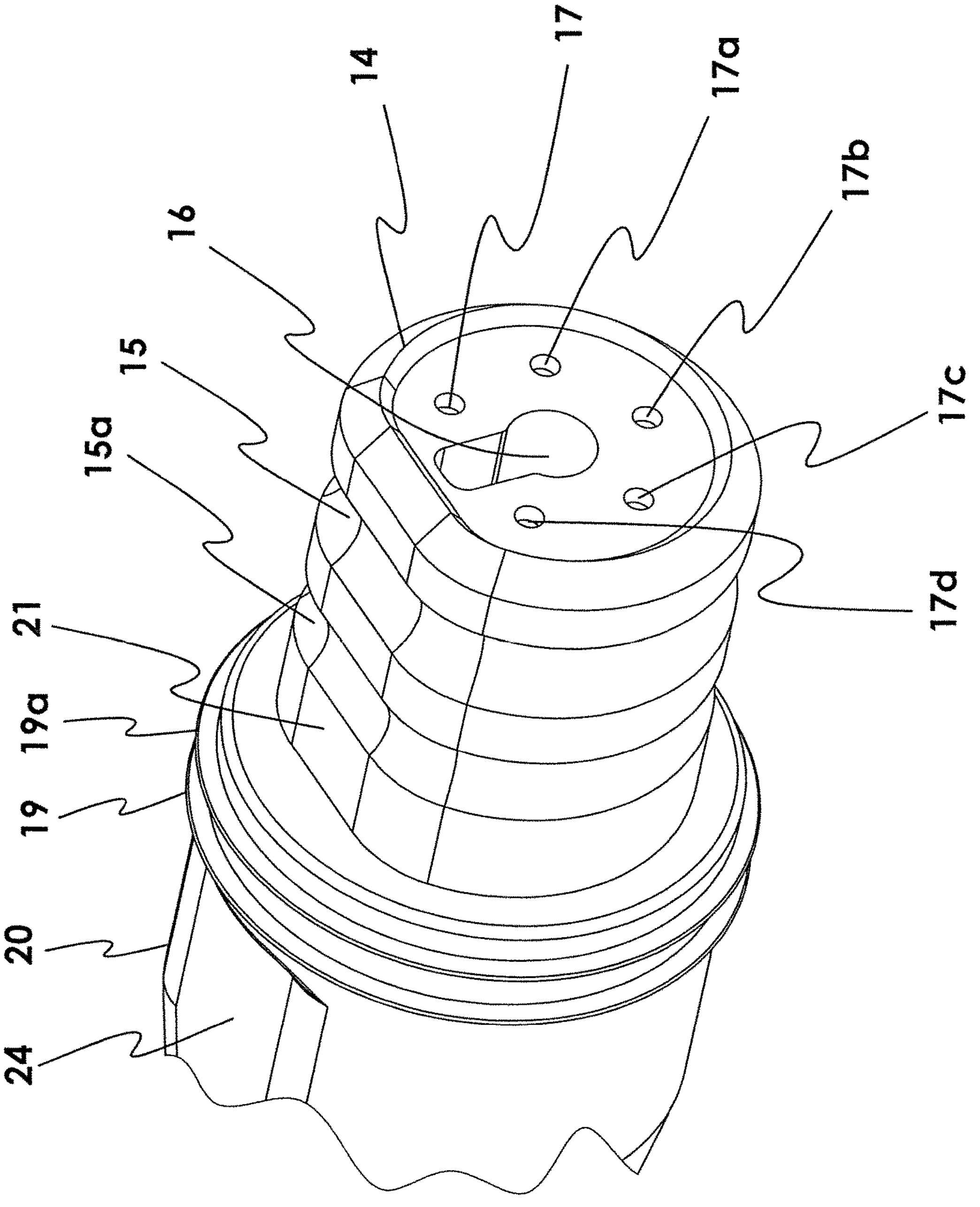
FIG. 5 is an enlarged prospective view of the male coupler element.

FIG. 5 shows an enlarged perspective view of the tip of the male coupler element from FIG. 4. One can see socket terminals 17-17d located on the face of rigid element 21 and surrounded by pointed lip feature 14 which is circumferentially formed around the end of rigid element 21. Also seen on rigid element 21 are grooves 15 and 15a which provide the second seal as well as the holding mechanism to keep male coupler 1 connected with female coupler 2. Looking further at FIG. 5 one can see the flexible triangular shaped sealing features 19 and 19a as well as the flat visual surface 24 located on flexible over-mold element 20; and key 16 is sized to receive key 13, as shown in FIGS. 3 and 3A.

Figure 6:
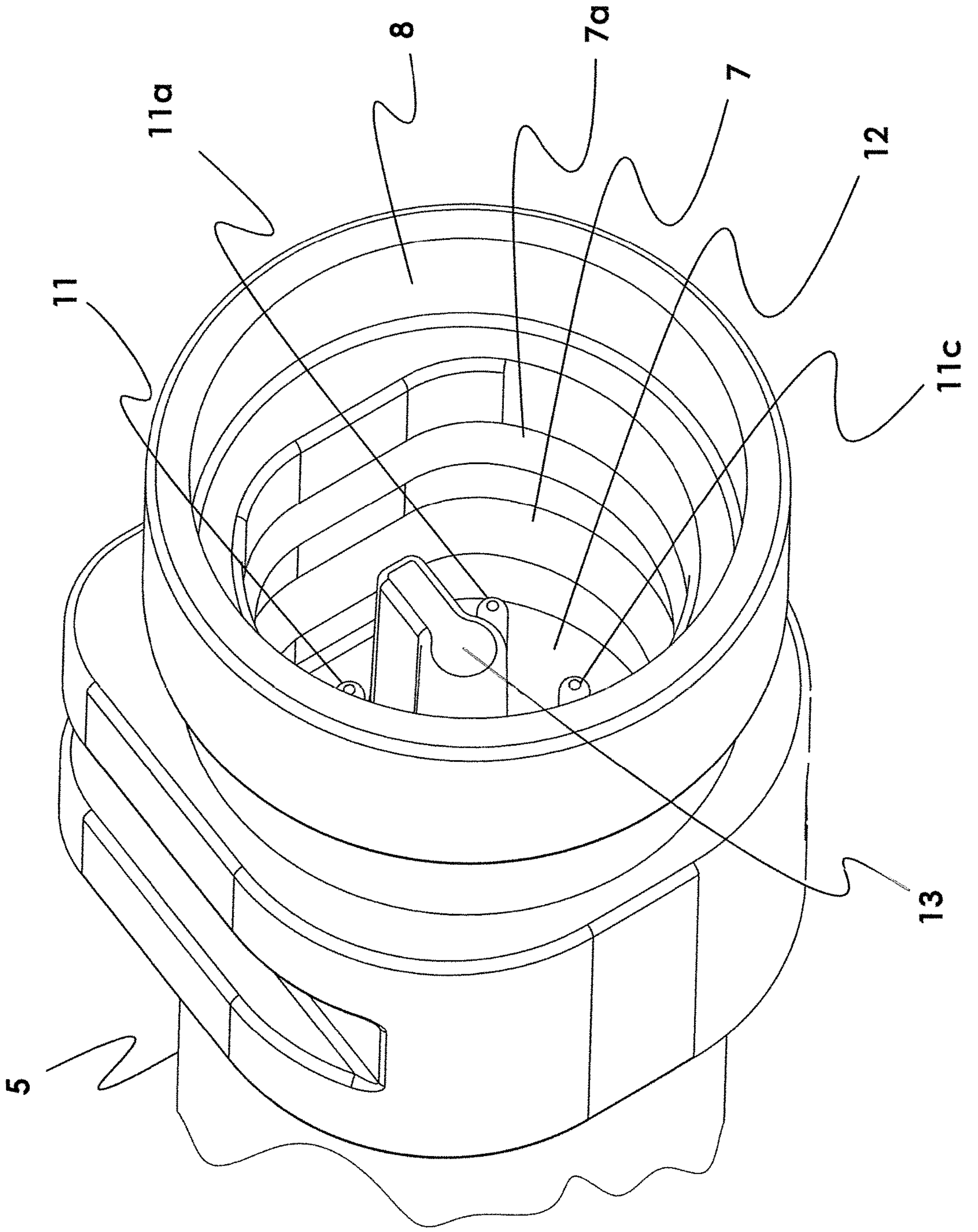
FIG. 6 is an enlarged prospective view of the female coupler element.

FIG. 6 is an enlarged perspective view of the flexible receptive end of the female coupler 2 from FIG. 3. The key 13 is shown in the center surrounded by three (3) of the male pin terminals 11-11c. Also shown are the flexible ring elements 7 and 7a that provide the second seal as well as the holding mechanism to keep male coupler 1 connected with female coupler 2. Looking further one can see the flexible sealing surface 8 formed on the end of flexible over-mold element 5.

Figure 7:
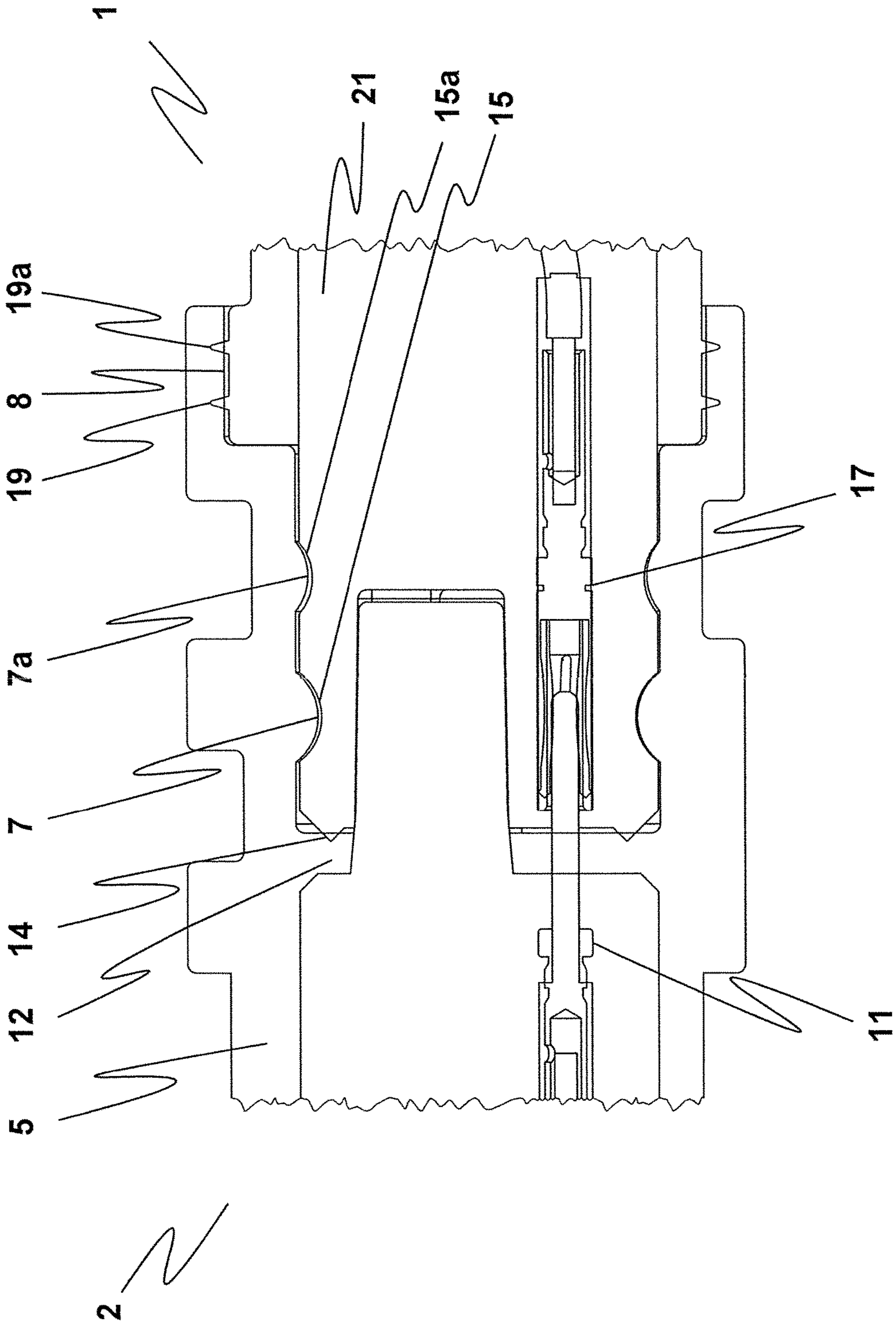
FIG. 7 is an enlarged partial view of the coupler system from FIG. 2.

FIG. 7 is an enlarged detail view of the mated male coupler 1 and female coupling element 2 from FIG. 2. Flexible triangular shaped sealing features 19 and 19a of coupler 1 can be seen imbedded into sealing surface 8 of female coupler 2 forming the initial seal. In this coupled view ring-shaped seal features 7 and 7a of flexible over-mold element 5 on coupler 2 are coupled to rigid groove features 15 and 15a formed on rigid element 21 located in coupler 1 forming the second seal. Looking further at this coupled view, connections are made, one of which is shown as pin terminal 11 connected to socket terminal 17 and surrounded by pointed lip feature 14 of the male coupler 1 which is securely pressed into flexible face 12 of female coupler 2 which forms the final moisture and dust seal so that communications or electrical connections, among others, can be transmitted along the line securely, uninterrupted, and free of moisture and dust caused failures.

The moisture and dust resistance of the coupler system of this invention is an improvement over the prior art. The device can be manufactured easily at a reasonable cost while outperforming the prior art coupler systems. Materials of construction may include, but are not limited to, polymers that can be injection molded for example, to form rigid and flexible elements. Rigid element materials may include, for example, polymers such as polypropylenes or nylons while flexible element material may include, but not limited to, thermoplastic elastomers such as thermoplastic rubbers or polyurethanes. The materials of construction of the internal elements shown in FIG. 2 may include, but are not limited to, gold plated brass socket shown as 17 mated with a gold-plated brass pin shown as 11. A pair of brass wing-bands 9 and 9a are shown crimped to cables 3 and 22 for the purpose of providing increased pull strength to the overall construction. All of the internal components are shown encapsulated within rigid polymeric materials of construction of this device shown as elements 21 and 4 of the male and female coupler elements, respectively.

The coupler system described in this invention can be easily disconnected by gripping the male coupler 1 and the female coupler 2 and simply pulling apart the two ends. To reconnect one simply needs to visually align the flat surface feature 23 shown in FIG. 3*a* with flat surface feature 24 shown in FIG. 4*a* then forcibly push the two coupler elements together until ring features 7 and 7*a* are mated to groove features 15 and 15*a* as shown in FIG. 2. This reconnection engages the three (3) sealing features as previously described and reestablishes the moisture and dust sealing capability of the coupler system.

Preferred uses for the coupling elements of this invention are for electrical and communication systems, where moisture and dust resistance are extremely critical for the proper function and longevity of these attached coupling elements. Typically, the attached coupling elements might be used in the medical equipment art field where protection from various types of fluids is paramount and where critical sterilization methods are employed ranging from simple antiseptic spraying to more aggressive autoclaving methods. Other uses might include the communications field both commercial and military, particularly where these elements are used in a hostile environment that might cause failures by corrosion due to moisture and dust infiltration, for example. Still other uses might be in the automotive and shipboard equipment field, both commercial and military. One use contemplated within the metes and bounds of this invention includes use as an accessory application for shipboard equipment. Here, the equipment includes power and communication connections where moisture and dust failures are a typical, normal and ongoing concern. Thus, employing the moisture and dust resistant coupler elements of this invention would be advantageous for this and similar applications. Looking carefully at the drawings again, one can easily see how the various parts of the male and female coupler elements are mated together in a manner so as to provide intimate contact and moisture and dust resistance. In FIGS. 3 and 4 and in 3A and 4A, the various parts can be seen in detail. For example, in FIG. 3, the female coupler 2 is seen in its entirety completely formed and ready to receive the male coupler 1. In FIG. 4 the male coupler 1 is seen with its parts disclosed and further exemplified in FIG. 4A. A male gripping element 20 found on coupler 1 containing triangular shaped sealing features 19 and 19*a* formed circumferentially on the gripping element will press into the inside of sealing surface 8 of over-mold element 5 found on coupler 2 to accomplish the first of three (3) moisture and dust seals. The male coupler 1 contains at least one pair of rigid grooves formed circumferentially around element 21 and shown as 15 and 15*a*. These rigid grooves, when inserted into female coupler 2 mate with a pair of flexible rings formed into the inside of over-mold element 5 completing the second of three (3) moisture and dust seals. Added further to the system is a rigid lip formed into the very end of the male coupler element, so that when the male and female coupler elements are coupled together the rigid lip of the male coupler element presses into the flexible face 12 of the female coupler 2 to ensure the third and final moisture and dust seal. All of the internal elements, of male coupler 1 and female coupler 2, such as for example conductors and terminals are contained fully within the core of this device and since moisture cannot penetrate this core, they remain moisture and dust free and secure. All of these elements are manufactured directly into the fabric of the element as it is being manufactured.

The parts for the elements of this invention are easily purchased and/or manufactured to specifications and then over-molded, producing the male and female coupler elements. Referring again to FIG. 2, a process whereby pin 11 is attached to conductor 10 and socket 17 to conductor 18, for example, by crimping or soldering may be preferred. Wing-band 9 is attached to cable 3 and wing-band 9*a* to cable 22 also incorporating a crimping process. This crimping can be adjusted to a specific crimp height as desired to meet a particular or desired pull force specification. The cable assemblies may then be injection molded, for example, first with a rigid polymer, commonly referred to in the molding field as pre-molding, and then with a flexible, thermoplastic elastomer as previously described herein, commonly referred to in the molding field as over-molding. These molding processes fully encapsulate the cable assemblies sealing them from moisture and dust penetration via the cable ends of the coupling elements. When the male and female coupling elements are then connected, the entire joint is rendered moisture and dust resistant with the ability to disconnect and reconnect as desired with the moisture and dust resistant seal repeating with each reconnection. No other element described within the prior art has such an easily manufactured element nor can they provide the ease of connection and reconnection while maintaining a level of moisture and dust resistance.

It will be appreciated that in the embodiment of the invention described above includes a connector for preventing fluid flow into a coupled together energy transmission line in a coupled together male and female coupler which includes one or more seals which prevent liquid and gas flow by using a combination of rigid and flexible seals, Indeed, in this embodiment, there is at least one seal which includes a flexible seal and a flexible mating seal for preventing fluid flow, at least two seals which include a rigid seal and a flexible mating seal for preventing fluid flow.

It will be appreciated by a person having ordinary skill in the art that variations of the invention described herein are possible.

It is contemplated that the type and composition of the material of the connector will be varied to achieve the objects of the invention, such as the connector being made of flexible and rigid materials which exhibit properties achieving the desired resistance to water degradation, resistance to saltwater degradation, resistance to water degradation, and resistance to degradation by ultraviolet light (uv) radiation.

The type and composition of the material of the connector will be selected to achieve that one or more of the first seal and the first mating seal, the second seal and the second mating seal, and the third seal and third mating seal prevent fluid flow at a pressure equal to a pressure exerted by water at a depth of 3 m for at least 24 h.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A connector, comprising:

a) a male coupler including a core and a layer on a perimeter of the core, the core having a free end, the free end of the core extending past the layer, and the core being more rigid than the layer; and an energy transmission line located within the core of the male coupler;

b) a first seal provided on an outer perimeter of the layer of the male coupler, the first seal including at least one triangular extension around the outer perimeter of the layer;

c) a second seal provided on the core of the male coupler, the second seal including at least one ring-shaped groove around the perimeter of the core;

d) a third seal provided on the perimeter of the core, the third seal including an angled lip around the perimeter of the core at the free end of the core;

e) a female coupler including a core having a free end, a layer on a perimeter of the core, the layer extending outwardly of the free end of the core, and the core being more rigid than the layer; and a further energy transmission line located within the core of the female coupler;

f) a first mating seal provided on the female coupler, the first mating seal including a face around an inner perimeter of the layer extending outwardly of the free end of the core of the female coupler, the face around the inner perimeter of the layer engaging with the at least one triangular extension around the outer perimeter of the layer of the male coupler;

g) a second mating seal provided on the female coupler, the second mating seal including at least one ring-shaped extension provided on the face of the layer on the female coupler which engages with and mates with a respective one of the at least one ring-shaped groove on the core of the male coupler;

h) a third mating seal provided on the female coupler, the third mating seal including a face on the layer which engages with and mates with the angled lip on the perimeter of the core of the male extension;

i) whereas, when the female coupler and the male coupler are coupled together, the energy transmission line in the male coupler and the further energy transmission line in the female coupler are coupled together for transmitting energy therethrough; and j) whereas, the first seal and the first mating seal, the second seal and the second mating seal, and the third seal and third mating seal prevent fluid flow into the coupled together energy transmission line in the coupled together male and female coupler at a pressure equal to a pressure exerted by water at a depth of 3 m.

2. The connector according to claim 1, wherein:

a) the first seal and the first mating seal, the second seal and the second mating seal, and the third seal and third mating seal prevent fluid flow at a pressure equal to a pressure exerted by water at a depth of 3 m for at least 24 h.

3. The connector according to claim 1, wherein:

a) the material of at least one of the first seal and the first mating seal, the second seal and the second mating seal, and the third seal and third mating seal is resistant to degradation by ultraviolet (UV) radiation.

4. The connector according to claim 1, wherein:

a) the material of at least one of the first seal and the first mating seal, the second seal and the second mating seal, and the third seal and third mating seal is resistant to degradation by saltwater.

5. The connector according to claim 1, wherein:

a) the material of the core of the male coupler, and the material of the core of the female coupler are each made of a polymer.

6. The connector according to claim 1, wherein:

a) the material of the layer of the male coupler, and the material of the layer of the female coupler are each made of a thermoplastic polymer.

7. The connector according to claim 1, wherein:

a) the material of at least one of the first seal and the first mating seal, the second seal and the second mating seal, and the third seal and third mating seal is resistant to degradation by water.

8. The connector according to claim 1, wherein:

a) the energy transmission line in the male coupler and the further energy transmission line in the female coupler are coupled together for transmitting electricity therethrough.

9. The connector according to claim 1, wherein:

a) the energy transmission line in the male coupler and the further energy transmission line in the female coupler are coupled together for transmitting telecommunications signals therethrough.

10. The connector according to claim 1, wherein:

a) the at least one triangular extension around the outer perimeter of the layer includes a continuous extension around the circumference of the perimeter.

11. The connector according to claim 10, wherein:

a) the at least one triangular extension around the outer perimeter of the layer includes a first triangular extension and a second triangular extension.

12. The connector according to claim 11, wherein:

a) the second triangular extension is adjacent to the first triangular extension.

13. The connector according to claim 1, wherein:

a) the at least one triangular extension around the outer perimeter of the layer includes a first triangular extension and a second triangular extension.

14. The connector according to claim 13, wherein:

a) the second triangular extension is adjacent to the first triangular extension.

* * * * *